(12) United States Patent
Mair et al.

(10) Patent No.: US 7,617,907 B2
(45) Date of Patent: Nov. 17, 2009

(54) AXLE PIVOT STEERING DEVICE OF A VEHICLE

(75) Inventors: Ulrich Mair, Friedrichshafen (DE); Klaus Kruber, Künzing (DE); Stefan Wallner, Friedrichshafen (DE); Grzegorz Ziemski, Bad Essen (DE); Markus Hülsmann, Ostercappeln (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/066,280

(22) PCT Filed: Sep. 27, 2006

(86) PCT No.: PCT/EP2006/009381

§ 371 (c)(1),
(2), (4) Date: Mar. 10, 2008

(87) PCT Pub. No.: WO2007/039200

PCT Pub. Date: Apr. 12, 2007

(65) Prior Publication Data

US 2008/0202843 A1  Aug. 28, 2008

(30) Foreign Application Priority Data

Sep. 30, 2005  (DE)  .................. 10 2005 046 895

(51) Int. Cl.
*B62D 5/02*  (2006.01)

(52) U.S. Cl. .................. 180/448; 180/434; 280/93.51; 280/93.502

(58) Field of Classification Search .................. 180/448, 180/434–437; 280/93.502, 93.504, 93.51, 280/93.511
See application file for complete search history.

(56) References Cited

U.S. PATENT DOCUMENTS

| | | | | |
|---|---|---|---|---|
| 1,722,003 | A * | 7/1929 | Lee | 403/158 |
| 3,494,221 | A * | 2/1970 | Gottschald | 74/586 |
| 3,730,653 | A * | 5/1973 | Drutchas et al. | 418/32 |
| 4,064,967 | A * | 12/1977 | Doolittle | 180/435 |
| 4,114,724 | A * | 9/1978 | Doolittle | 180/435 |
| 4,522,418 | A * | 6/1985 | Struck et al. | 280/93.507 |
| 5,094,312 | A * | 3/1992 | Hakel | 180/434 |
| 5,613,572 | A * | 3/1997 | Moedinger | 180/400 |
| 6,047,789 | A * | 4/2000 | Iwanaga | 180/440 |
| 6,062,578 | A * | 5/2000 | Richardson | 280/81.6 |

(Continued)

FOREIGN PATENT DOCUMENTS

DE  1 555 295  3/1972

(Continued)

*Primary Examiner*—Lesley D Morris
*Assistant Examiner*—Tashiana Adams
(74) *Attorney, Agent, or Firm*—Davis & Bujold, P.L.L.C.

(57) ABSTRACT

An axle pivot steering device (4) of a vehicle having first lever elements (8A_1, 8B_1), which are respectively operatively connected, via a second lever element (8A_2, 8B_2), with a wheel carrier (10A, 10B). The first lever elements (8A_1, 8B_1) and the second lever elements (8A_2, 8B_2) are connected with third lever elements (13A, 13B), in an articulated manner, at fixed rotational points (14A, 14B). At least two of the lever elements (8A_1, 8A_2, 13A) are designed to be fork-shaped and be inter-coupled, in an area of the rotational points (14A, 14B), by a bearing bolt (15) such that the bearing torques resulting from the bearing forces acting on the bearing bolt (15) are at least approximately zero.

6 Claims, 10 Drawing Sheets

U.S. PATENT DOCUMENTS

| | | | |
|---|---|---|---|
| 6,375,441 B1 * | 4/2002 | Ichizuki et al. | 418/30 |
| 6,709,242 B2 * | 3/2004 | Watanabe et al. | 417/220 |
| 6,719,311 B2 * | 4/2004 | Davis et al. | 280/93.502 |
| 7,207,783 B2 * | 4/2007 | Uchino | 417/220 |
| 7,389,998 B2 * | 6/2008 | Kondo et al. | 280/93.502 |
| 2001/0031204 A1 * | 10/2001 | Oba et al. | 417/220 |
| 2002/0135149 A1 * | 9/2002 | McHale | 280/93.512 |
| 2003/0007876 A1 * | 1/2003 | Watanabe et al. | 417/220 |
| 2003/0214110 A1 * | 11/2003 | Diener et al. | 280/93.51 |
| 2005/0019174 A1 * | 1/2005 | Uchino et al. | 417/410.3 |
| 2006/0096800 A1 * | 5/2006 | Saibold et al. | 180/434 |
| 2007/0148029 A1 * | 6/2007 | Yamamuro et al. | 418/30 |
| 2007/0187917 A1 * | 8/2007 | Hasegawa et al. | 280/93.51 |

FOREIGN PATENT DOCUMENTS

| | | |
|---|---|---|
| DE | 32 16 728 A1 | 11/1983 |
| DE | 43 36 286 C1 | 1/1995 |
| DE | 697 18 726 T2 | 9/2003 |
| DE | 10 2004 053 722 A1 | 5/2006 |
| EP | 0 741 069 A2 | 11/1996 |
| EP | 0 897 852 A2 | 2/1999 |
| EP | 1 500 575 A2 | 1/2005 |
| GB | 2 282 997 A | 4/1995 |

* cited by examiner

US 7,617,907 B2

AXLE PIVOT STEERING DEVICE OF A VEHICLE

This application is a national stage completion of PCT/EP2006/009381 filed Sep. 27, 2006, which claims priority from German Application Serial No. 10 2005 046 895.0 filed Sep. 30, 2005.

FIELD OF THE INVENTION

The invention concerns an axle pivot steering device of a vehicle.

BACKGROUND OF THE INVENTION

DE 10 2004 053 722 has disclosed a vehicle having at least one axle that is designed to be steerable via an axle pivot steering system. The axle pivot steering system is designed with a main steering cylinder device connected in an articulated manner with tie rods. The tie rods are operatively connected with respective wheel carriers. In the area between the main cylinder device and one wheel carrier, the steering kinematics of the axle pivot steering system is, in articulated manner, in operative connection with a level element rotatable about a fixed rotational point in a manner such that, depending on a position of the rotational point and a length of the lever element, a steering angle error corresponding to a required steering angle is essentially minimized by reduction of the angle of lock of the wheel that is at the moment outside the curve in relation to the angle of lock of the wheel that is at the moment inside the curve.

It is to a disadvantage that the connecting joint, between tie rods of the tie rod and the lever elements, are constructed as ball joints in which case, due to the asymmetrically distributed points of acting force, act on bearing torques which have to be supported. The bearing torques are supported via the tie rods and the lever elements for which reason the structural parts of the axle pivot steering system must be dimensioned accordingly. This, however, results in an increase of the weight of the vehicle, as well as the production costs of the axle pivot steering system.

In addition, it is a disadvantage that the bearing torques to be supported, especially in the case of low-friction bearings, result in asymmetrical load distributions which, due to the so-called tip-to-tip contact resulting therefrom produce high control forces or steering forces thus reducing the lifespan of the connecting joints of the axle pivot steering system to undesirable extent.

Therefore, the problem on which this invention is based is to make an axle pivot steering device available, which can be produced of simple construction and is characterized by long durability and low cost of production.

SUMMARY OF THE INVENTION

An inventive axle pivot steering device of a vehicle is designed with first lever elements each in operative connection via a second lever element with a respective wheel carrier and in the area of their connections with the second lever elements are connected in an articulated manner via third lever elements with respective fixed rotational points.

According to the invention, at least two of the lever elements in the connecting area of the lever elements are designed to be fork-shaped and, in addition, designed with interspaced bearing points crossed by a bearing bolt.

It is thus obtained in a constructionally simple manner and at reasonable cost that the bearing torques resulting from the bearing forces acting on the bearing bolt be approximately zero wherewith tip-to-tip contact is prevented in the area of the connecting joint having sliding bearings. In addition, the structural parts or lever elements of the axle pivot steering device connected via the connecting joint, compared to lever elements connected via conventional double-acting ball joints, can be dimensioned with smaller cross-sections whereby a total weight of the vehicle is easily reduced.

BRIEF DESCRIPTION OF THE DRAWINGS

The invention will now be described, by way of example, with reference to the accompanying drawings in which.

DETAILED DESCRIPTION OF THE INVENTION

Figure 1A:
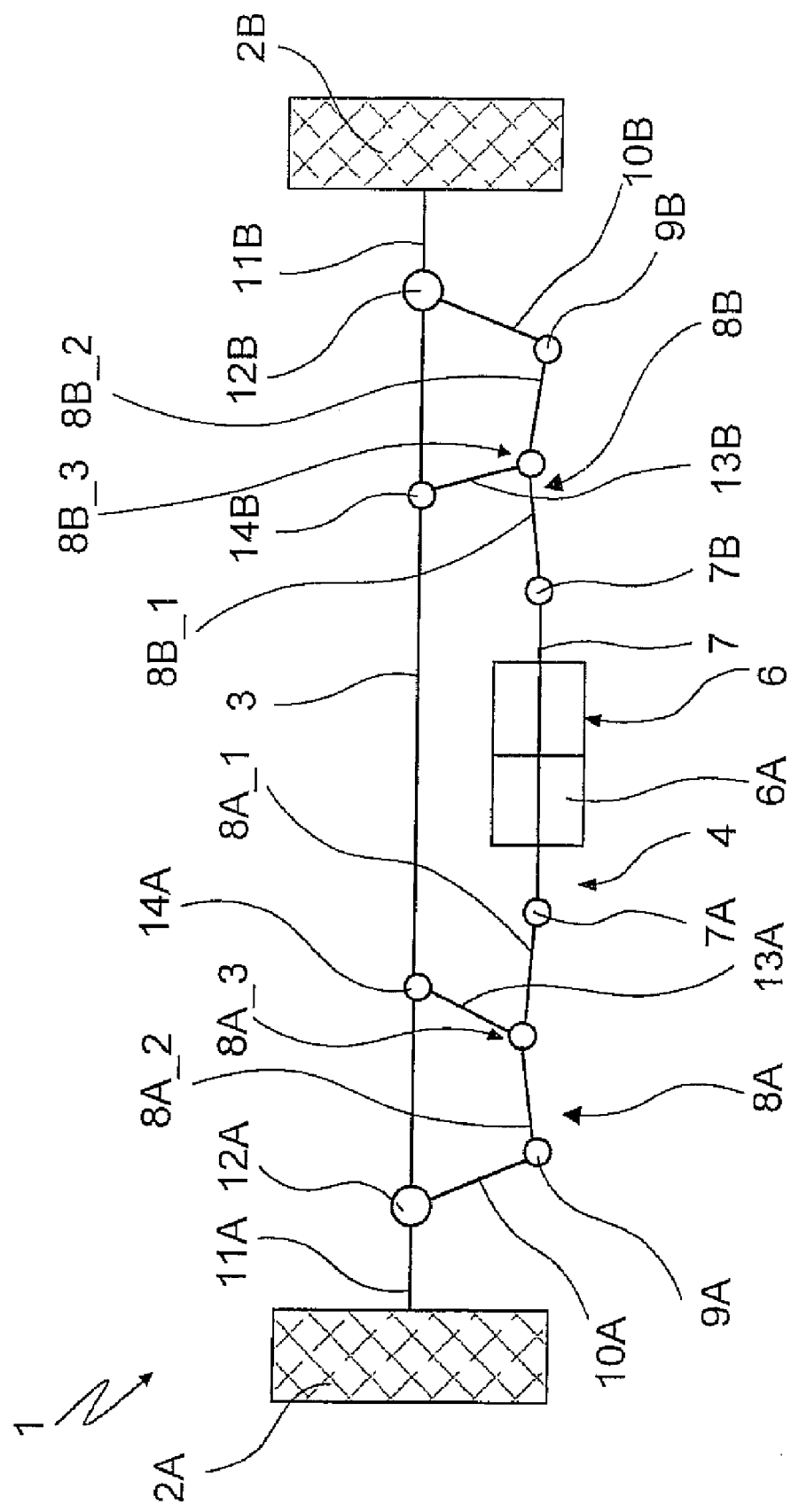
FIG. 1A is a fundamental representation of an axle pivot steering device of a vehicle axle whose steering kinematics in the area between a main steering cylinder device and wheel carriers is operatively connected with a lever element in a state equivalent to straight ahead driving.
Figure 1B:
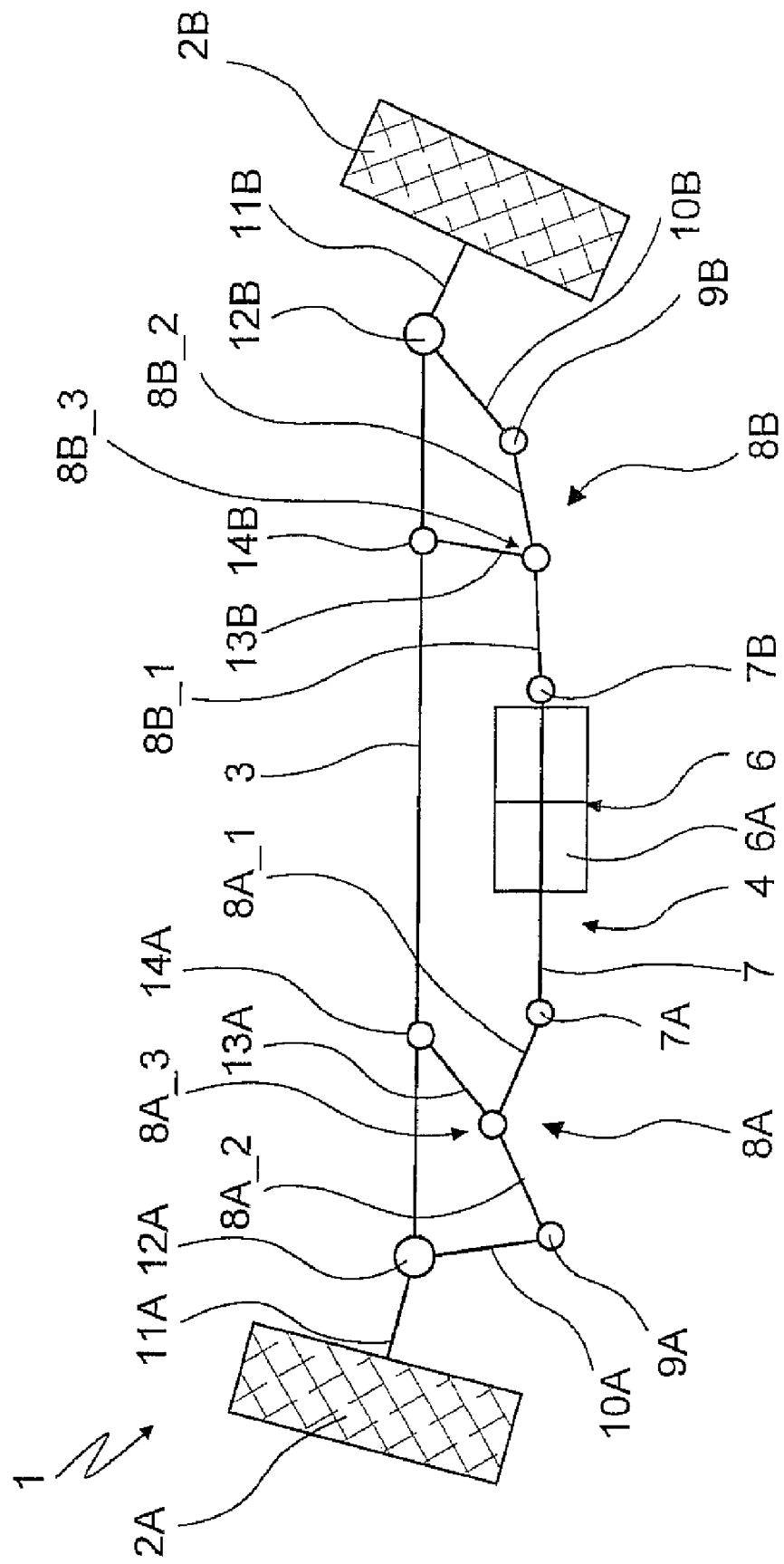
FIG. 1B is the vehicle axle, shown in FIG. 1A, in a state equivalent to cornering.

FIG. 1A shows one steerably designed vehicle axle 1 of a vehicle in a schematized single representation preferably designed as a construction vehicle. Wheels 2A and 2B of the steerable vehicle axle 1 are transferable from the position shown which corresponds to straight ahead driving of the vehicle or to a tilted position for cornering of the vehicle; the vehicle axle 1 in FIG. 1B is shown as a front axle while the driver is steering through a right-hand curve. For changing the vehicle's direction of travel, the wheels 2A and 2B of the vehicle axle 1 can be moved, via an axle pivot steering device 4 from the position shown in FIG. 1A to the tilted position corresponding to the steering angle required at the moment.

The axle pivot steering device 4 is built with a main cylinder device 6 designed with a sliding cylinder 6A which is transverse to the alignment of the vehicle and parallel with an axle 3 of the vehicle axle 1 situated in a manner, between the wheels 2A, 2B. One piston rod 7 of the main cylinder device 6 is connected at both of its ends, via a piston rod joint 7A, 7B designed as a ball joint, respectively, with tie rods 8A and 8B. The tie rods 8A and 8B are, in turn, connected with wheel carriers 10A, 10B, via tie rod joints 9A, 9B, situated on their ends remote from the piston tie rod 7. The wheel carriers 10A, 10B are fixedly connected with wheel hubs 11A, 11B of the wheels 2A and 2B which are, in turn together with the wheels 2A and 2B, tiltably designed in relation to the axle 3 around the steering rotational axles 12A, 12B.

To influence the tilting movement of the wheels 2A, 2B of the vehicle axle 1 produced by the movement of the piston rod 7, the distance between the tie rod joints 9A, 9B and the piston rod joints 7A, 7B are modified. For this purpose, the tie rods 8A, 8B are constructed of two parts, respectively 8A_1, 8A_2 and 8B_1, 8B_2, which represented the first and second lever elements, and are interconnected in articulated manner via connecting joints 8A_3 and 8B_3.

In the area of the connecting joints 8A_3, 8B_3, the tie rods 8A, 8B are connected in an articulated manner via third lever elements 13A, 13B with the axle 3 of the vehicle axle 1. On their ends, remote from the connecting joints 8A_3 and 8B_3, the two third lever elements 13A and 13B are designed to rotate around rotational points 14A, 14B and are fixedly connected with the axle 3 and can also be secured at another point on the side of the body so that the connecting joints 8A_3 and 8B_3 are, in an articulated manner, operatively connected with the axle 3 so that the third lever elements 13A and 13B each constitute a compulsory guide for the connecting joints 8A_3 and 8B_3 and the steering angle lock of the wheel that is on the outside the curve in relation to the steering angle lock of the respective wheel that is inside the curve, is reduced and thus a steering angle error is preferably reduced toward zero.

The advantage of the steering kinematics of the axle pivot steering device 4 of the vehicle axle 1 is seen from the comparison of the representations, according to FIG. 1 and FIG. 2. The direct comparison of the two representations shows that both the angle, between the first lever element 8A_1 and the second lever element 8B_2, the same as between the wheel carrier 10A and the lever element 8A_2 connected therewith, via the tie rod joint 9A, compared to the angles, between the first lever element 8B_1 and the second lever element 8B_2, the same as between the wheel carrier 10B and the second lever element 8B_2 connected therewith in an articulated manner, via the tie rod joint 9B, are changed so that the steering angle lock of the wheel 2A outside the curve in relation to the steering angle lock of the wheel 2B inside the curve, compared to a vehicle known from the practice, is reduced in the sense that a steering angle error between the two wheels 2A and 2B is easily minimized.

This means that the rotational point 14A and 14B, the same as the lengths of the third lever elements 13A and 13B, are provided so that the steering kinematics coordinated with the wheel 2A on the outside of the curve, is changed as described above and a steering angle error is minimized while the structural parts of the steering kinematics coordinated with the wheel 2B on the inside of the curve in the area of the first and second lever elements 8B_1 and 8B_2 remain almost on one line so that the steering angle lock of the wheel on the inside of the curve at the moment produced by the control of the main steering cylinder device 6, compared to a conventionally designed steerable axle, is adjusted almost without change, extensively schematized.

Figure 2A:
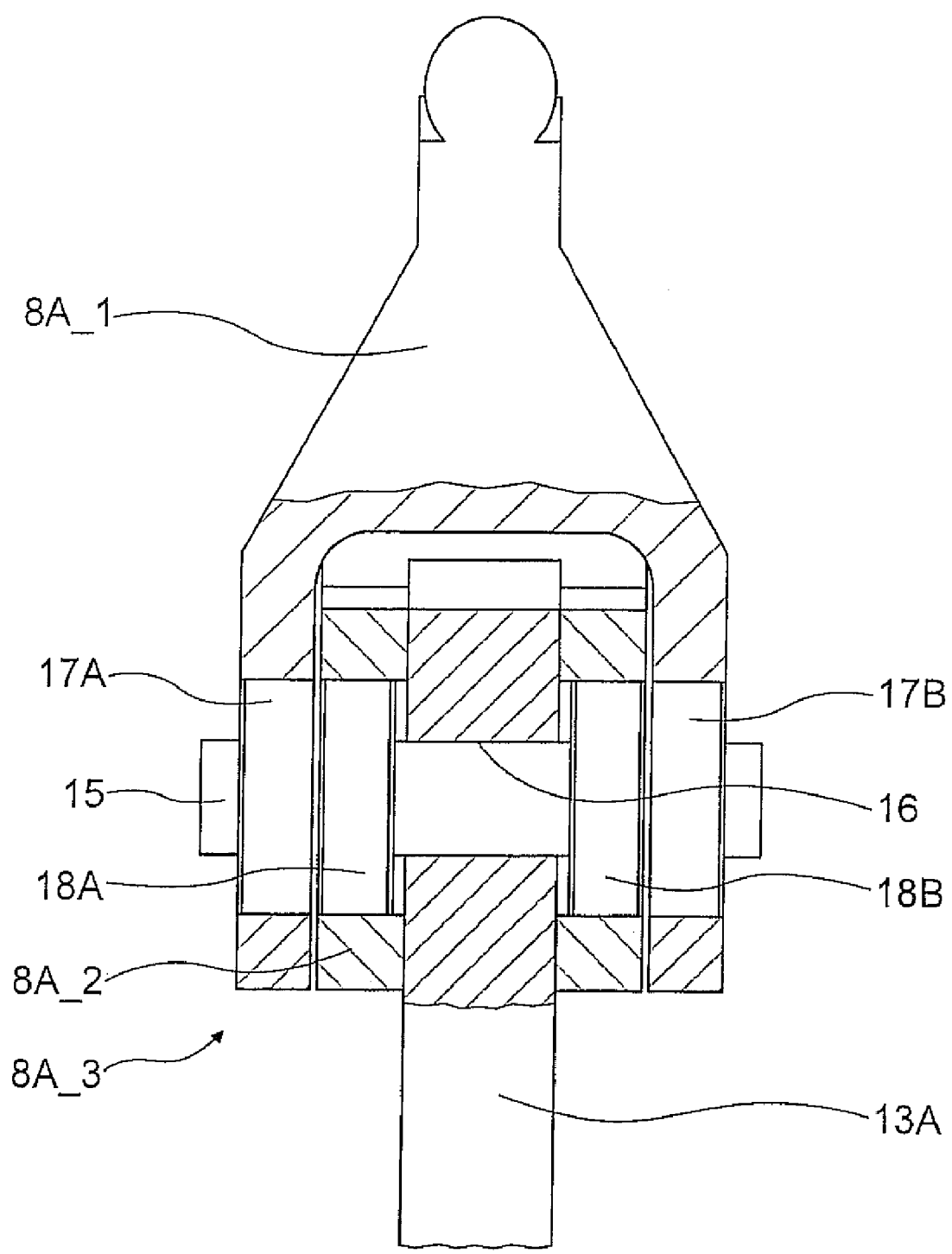
FIG. 2A is a first embodiment of a connecting joint of the axle pivot steering device, according to FIG. 1A, in longitudinal view.
Figure 2B:
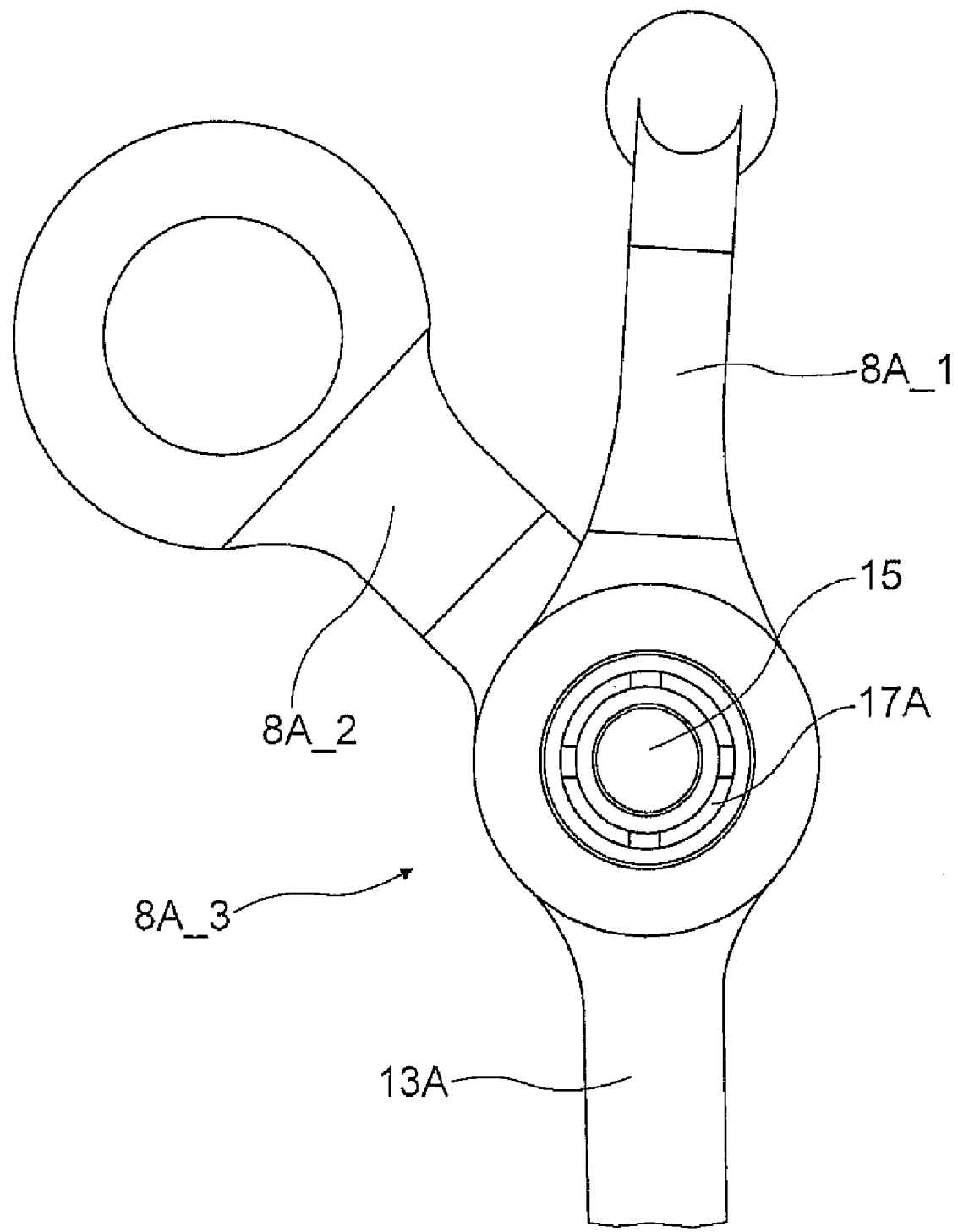
FIG. 2B is a two-dimensional top plan view of the connecting joint according to FIG. 2A.

In extensively schematized FIG. 2A and FIG. 2B is shown a first embodiment of the connecting joint 8A_3 by way of which the three lever elements 8A_1, 8A_2 and 13A are interconnected in an articulated manner, as described above.

The first lever element or the first tie rod part 8A_1 and also the second lever element or the second tie rod part 8A_2 are in the connecting area of the lever elements 8A_1, 8A_2 and 13A designed to be fork-shaped and constructed interspaced, the same is passed by a bearing bolt 15. The third lever element 13A is in the connecting area of the lever elements 8A_1, 8A_2 and 13A, designed at least approximately to have an I-profile shape and be encompassed by the fork-shaped areas of the first lever element 8A_1 and of the second lever element 8A_2 and are rotatably connected via a bearing bolt 15 with the two other lever elements 8A_1 and 8A_2.

The bearing bolt 15 is inserted into a throughbore 16 of the third lever element 13A and thus non-rotatably connected therewith. Additionally, between the first lever element 8A_1 and the bearing bolt 15 and also between the second lever element 8A_2 and the bearing bolt 15, both roller bearing devices 17A, 17B and/or 18A and 18B are respectively provided.

Figure 3A:
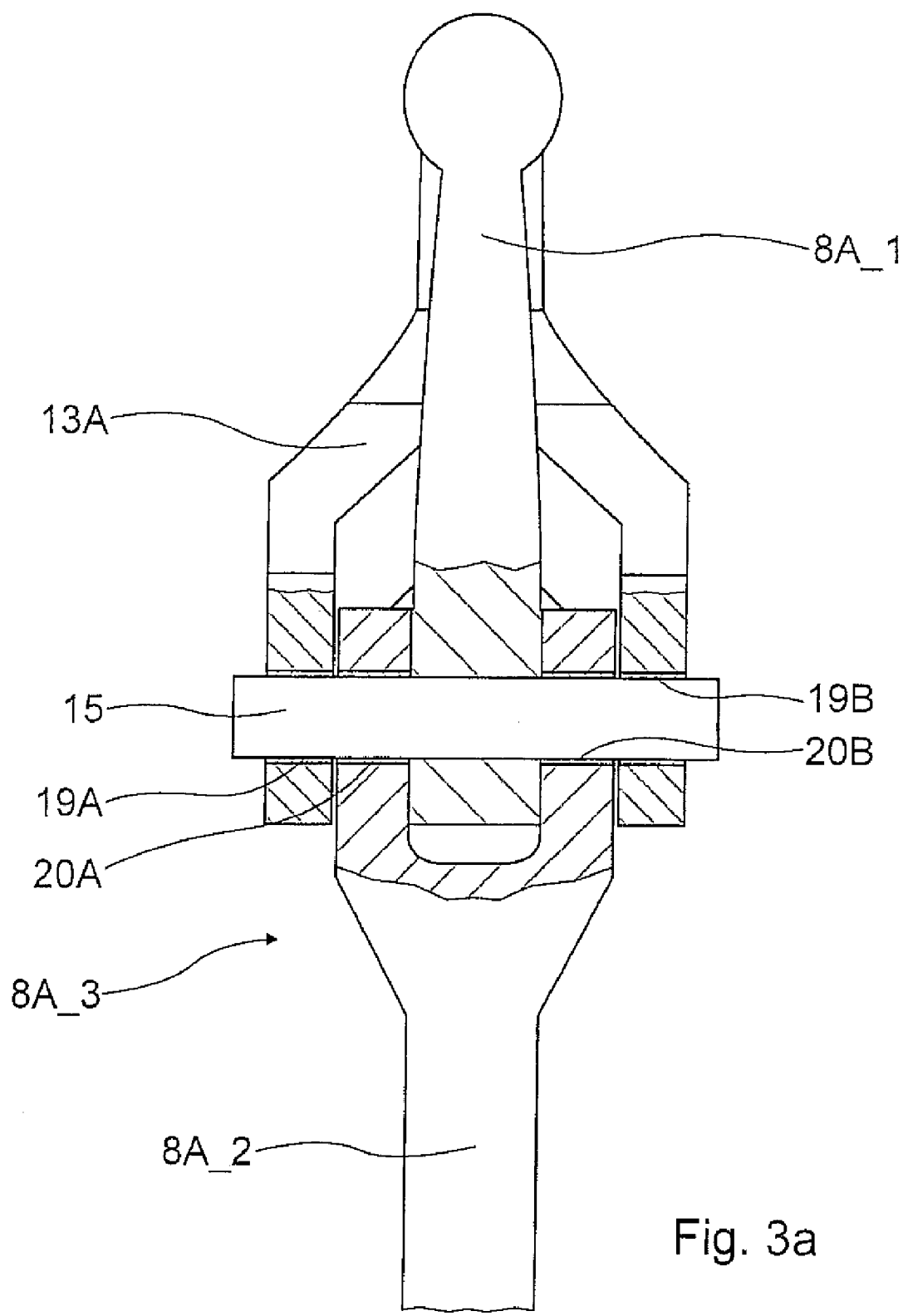
FIG. 3A is a second embodiment of the connecting joint shown only extensively schematized in longitudinal section.
Figure 3B:
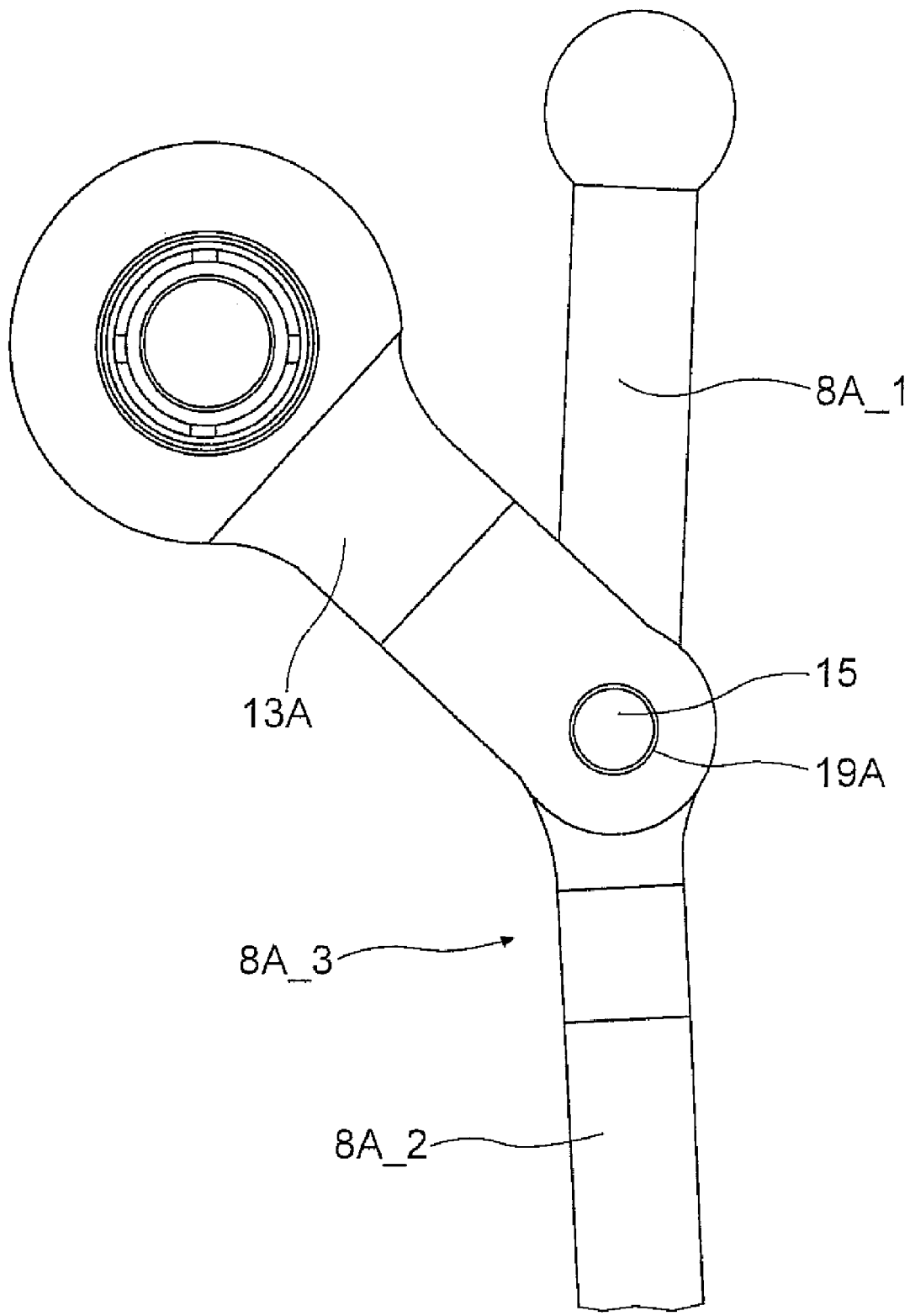
FIG. 3B is a two-dimensional top plan view of the connecting joint according to FIG. 3A.

The connecting joint 8A_3, shown in FIG. 2A and FIG. 2B, as a result of the asymmetrical uniting of the three lever elements 8A_1, 8A_2 and 13A on the bearing bolt 15, are outwardly rotationally fixed so that, via the lever elements 8A_1, 8A_2 and 13A, essentially only traction and pressure forces have to be transmitted whereby the lever elements, unlike the axle pivot steering devices known from the prior art where the bearing torques have to be supported via the lever elements, can be designed with slight resistance torques In FIG. 3A and FIG. 3B, a second embodiment of the connecting joint 8A_3 is shown, which essentially differs from the first embodiment, shown in FIG. 2A and FIG. 2B, only in the area of the selected bearing kinds, between the bearing bolt 15 and the lever elements 8A_1, 8A_2 and 13A. In the second embodiment of the connecting joint 8A_3, the bearing bolt 15 is non-rotatably connected with the first lever element 8A_1 via a pressed fit while, between the second lever element 8A_2 and the bearing 15, the same as between the third lever element 13A and the bearing bolt 15, respective sliding bearing 19A, 19B and/or 20A, 20B are provided.

One other difference between the first embodiment of the connecting joint 8A_3, according to FIG. 1A, and the second embodiment of the connecting joint 8A_3, according to FIG. 2A, is that in the second embodiment the third lever element 13A in the connecting area of the lever elements is designed to be fork-shaped encompassing both the fork-shaped area of the second lever element 8A_2 and the first lever element 8A_1 designed to have at least approximately an I-profile in the connecting area of the lever elements.

Figure 4A:
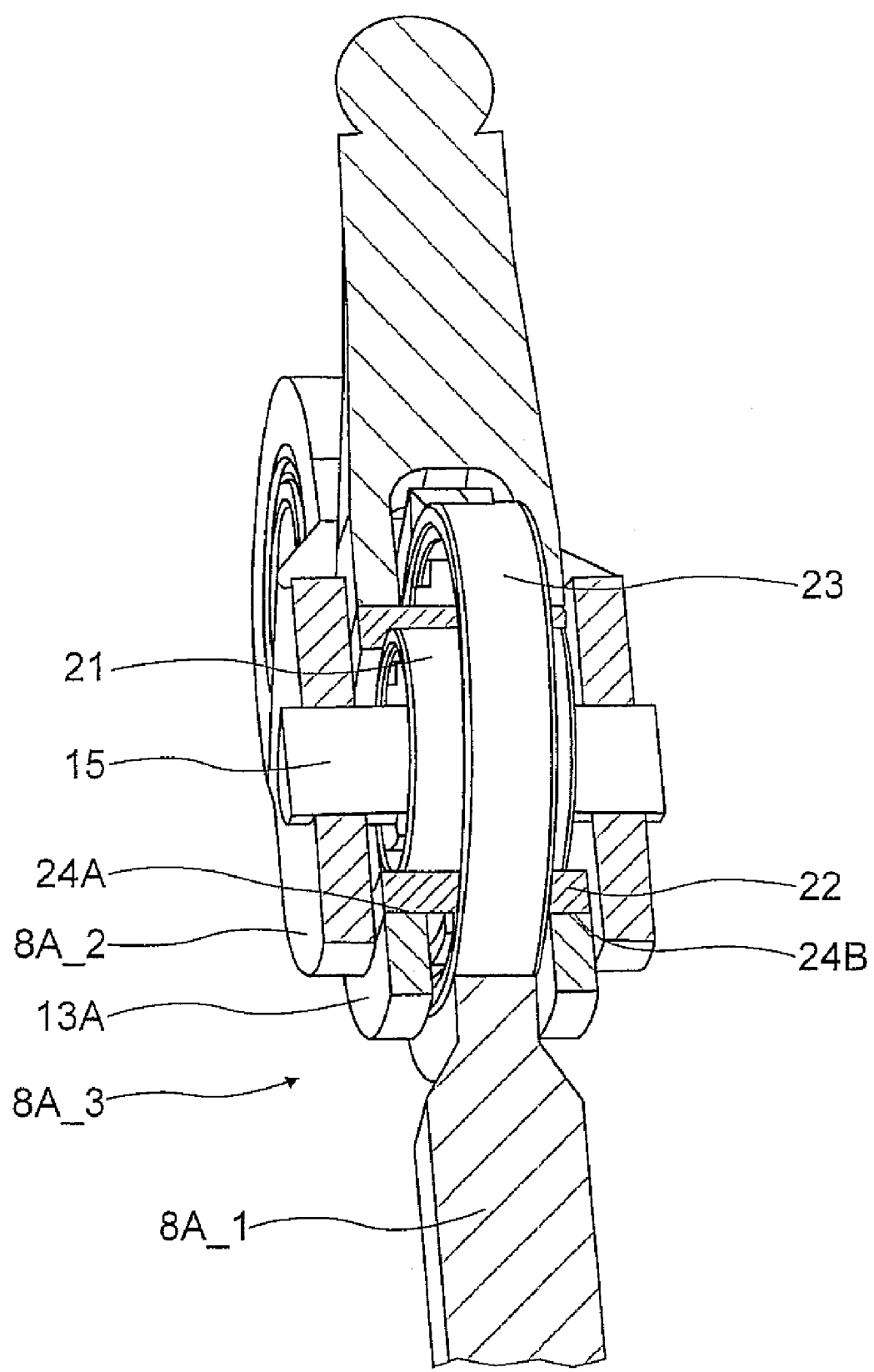
FIG. 4A is a three-dimensional partial section of a third embodiment of the connecting joint according to FIG. 1A.
Figure 4B:
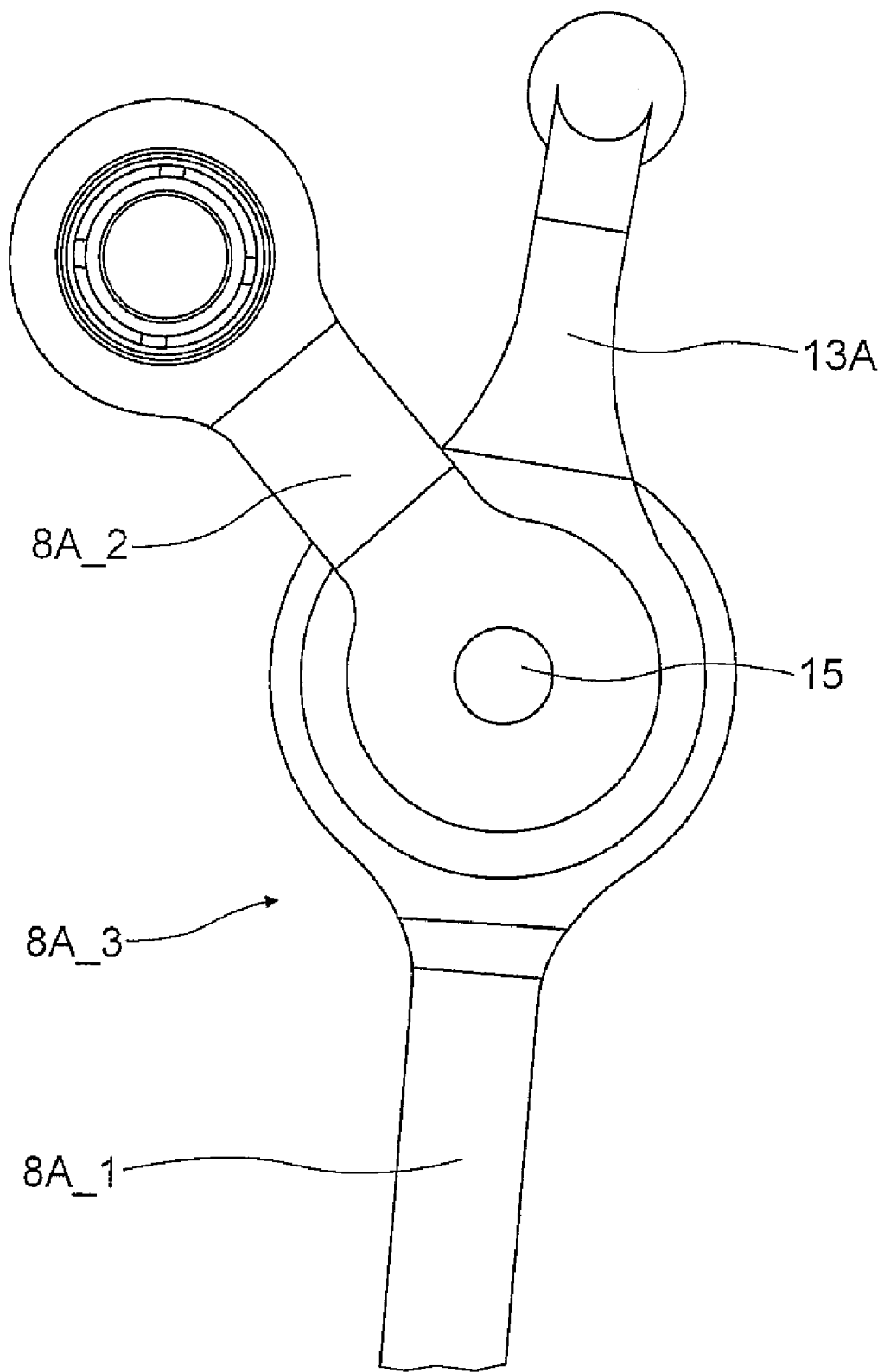
FIG. 4B is a two-dimensional top plan view of the connecting joint in FIG. 4A.
Figure 5A:
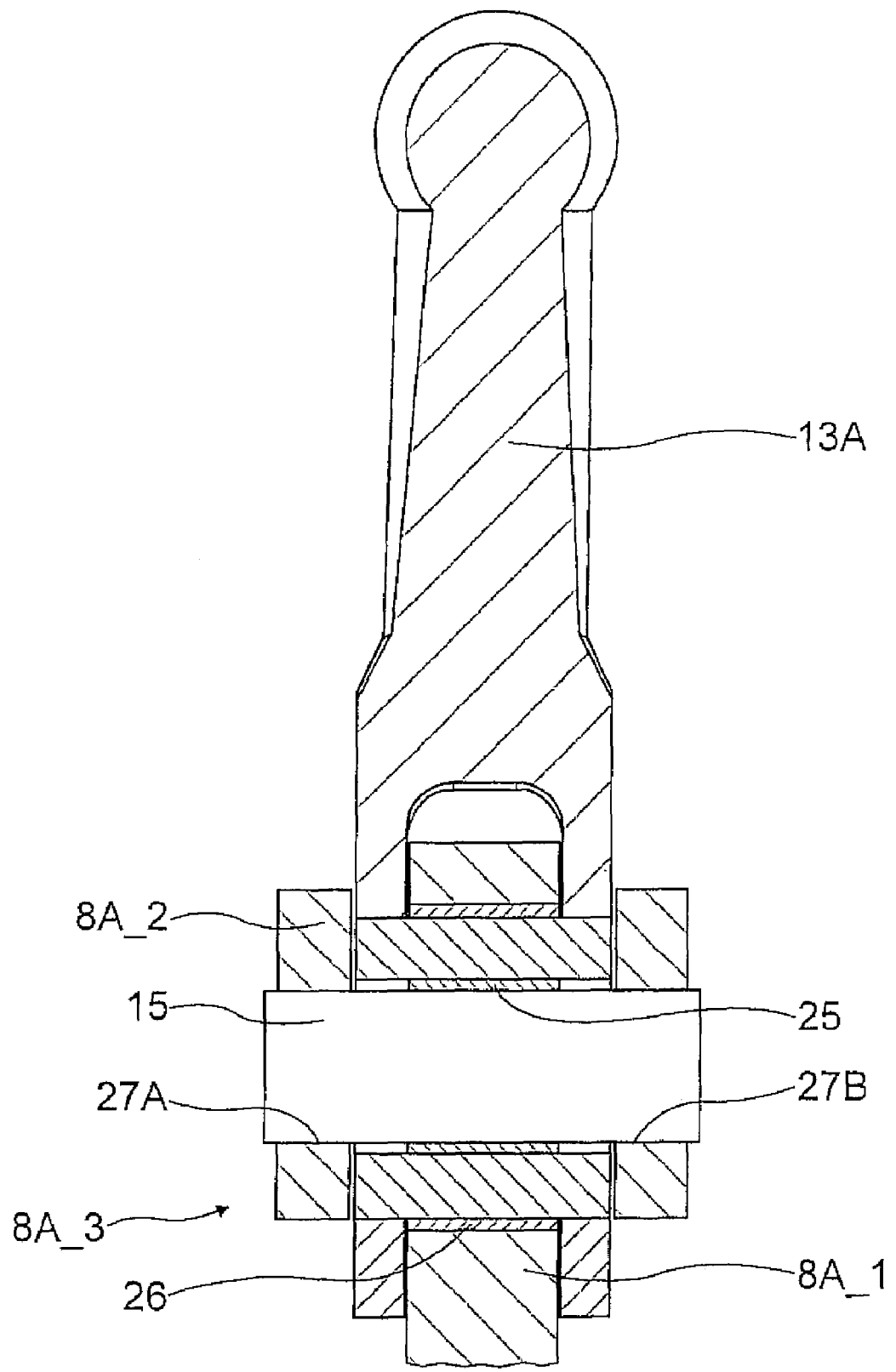
FIG. 5A is a longitudinal view of a fourth embodiment of the connecting joint of FIG. 1A.
Figure 5B:
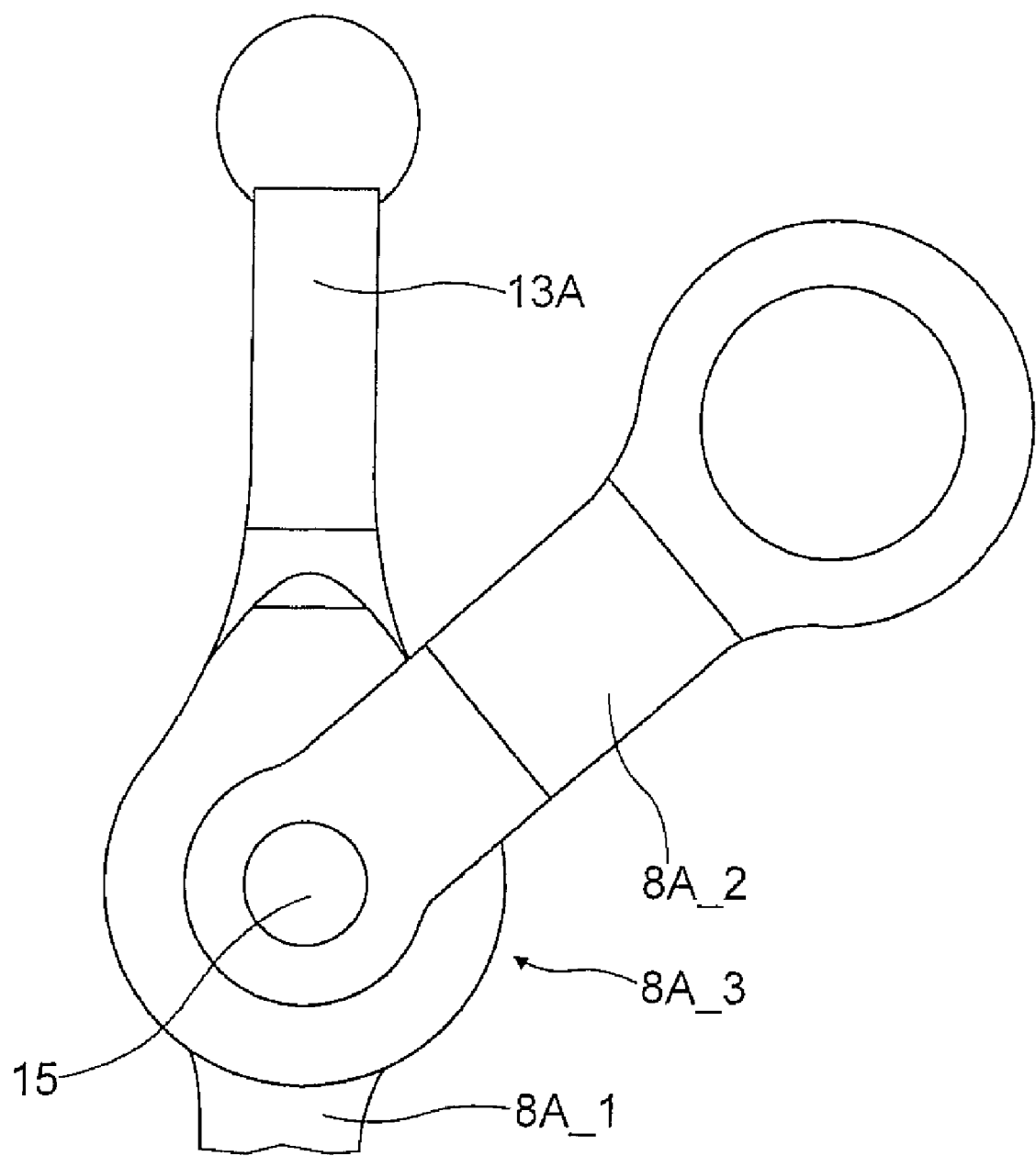
FIG. 5B is a top view of the connecting joint of FIG. 5A.

In FIGS. 4A and 4B, a third embodiment of the connecting joint 8A_3 is shown, according to FIG. 1A which, like the fourth embodiment of the connecting joint 8A_3, according to FIG. 1A shown in FIG. 5A and FIG. 5B, when compared to the first two embodiments according to FIG. 2A and according to FIG. 3A in relation to the longitudinal axis of the bearing bolt 15, is built with a smaller bearing height, a bearing diameter in the third embodiment and in the fourth embodiment is larger than the bearing diameter of the first two embodiments of the connecting joint 8A_3.

In the third embodiment of the connecting joint 8A_3, according to FIG. 4A, the bearing bolt 15 is non-rotatably connected via a press fit with the second lever element 8A_2, which forms the outer fork of the connecting joint 8A_3. The third lever element 13A is rotatably supported on the bearing bolt 15 via a roller bearing device 21. A bearing sleeve 22 is located between the third lever element 13A and the roller bearing device 21 and also provides support for the first lever element 8A_1, and one other roller bearing device 23 by way of which the first element 8A_1 is rotatably supported on the bearing bolt 15.

The shorter bearing height of the connecting joint 8A_3, according to FIG. 4A, is made possible by the fact that the interspaced bearings of the fork-shaped area of the third lever element 13A, as result of reduced pressure due to the enlarged bearing diameter is compared to the first two embodiments of the connecting joint 8A_3, can be designed with a reduced wall thickness. At the same time, the wall thickness of the first lever element 8A_1, designed in the connecting area of the lever elements to have an approximate I-profile shape, due to the enlarged bearing diameter and the thereby reduced compression, is also reduced compared to the connecting joints according to FIG. 2A and FIG. 3A so that the connecting joint 8A_3 according to FIG. 4A is altogether practicable with the lesser bearing height.

The reduction of the wall thickness of the bearings of the third lever element 13A, passed through by the bearing bolt 15, of the connecting joint 8A_3 according to FIG. 4A, is also made possible because there is no relative movement between the bearing sleeve 22 and the third lever element 13A inasmuch as the bearing sleeve is pressed into throughbores 24A and 24B of the third lever element 13A.

In the fourth embodiment of the connecting joint 8A_3, according to FIG. 1A and FIG. 1B, which is shown in FIG. 5A and FIG. 5B, for roller bearing device 21 and 23 of the connecting joint 8A_3, according to FIG. 4A, are substituted sliding bearing devices 25 and 26 which, compared to roller bearing devices, represent an alternative at a more reasonable cost.

For the rest, the construction of the connecting joint 8A_3, according to FIG. 5A, corresponds to the construction of the connecting joint, according to FIG. 4A, in which the bearing bolt 15 is inserted into respective throughbores 27A and 27B of the second lever element 8A_2, thereby preventing relative movement between the bearing bolt 15 and the second lever element 8A_2.

In all the above described four embodiments of the connecting joint 8A_3, there basically exists the possibility of varying the arrangement of the three lever elements 8A_1, 8A_2 and 13A according to the utilization at the moment so that optionally the first lever element 8A_1, the second lever element 8A_2 or the third lever element 13A in the connecting area of the lever elements are designed to have an approximate I-profile shape and encompassed by the fork-shaped areas of the two other lever elements 8A_2, 13A and/or 8A_1, 13A or 8A_1 and 8A_2, as shown in the drawings.

REFERENCE NUMERALS 1 vehicle axle
2A, 2B wheel
3 axle
4 axle pivot steering system
6 main steering cylinder
6A sliding cylinder
7 piston rod
7A, 7B piston rod joint
8A, 8B tie rod
8A_1, 8B_1 tie rod part, first lever element
8A_2, 8B_2 tie rod part, second lever element
8A_3, 8B_3 connecting joint
9A, 9B tie rod joint
10A, 10B wheel carrier
11A, 11B wheel hub
12A, 12B steering rotational axle
13A, 13B third lever element
14A, 14B point of rotation
15 bearing bolt
16 throughbore of the third lever element
17A, 17B roller bearing device
18A, 18B roller bearing device
19A, 19B sliding bearing device
20A, 20B sliding bearing device
21 roller bearing device
22 bearing sleeve
23 roller bearing device
24A, 24B throughbore of the third lever element
25 sliding bearing device
26 sliding bearing device
27A, 27B throughbore of the second lever element

The invention claimed is:

1. An axle pivot steering device (4) of a vehicle having first lever elements (8A_1, 8B_1) each of which is operatively connected, via an independent second lever element (8A_2, 8B_2), with a respective wheel carrier (10A, 10B) and, in an area of the connection between the first lever elements (8A_1, 8B_1) and the second lever elements (8A_2, 8B_2), are connected via a third lever element (13A, 13B), in an articulated manner, with respective fixed points of rotation (14A, 14B), at least two of the first lever elements (8A_1, 8A_2), the second lever elements (8A_2, 8B_2) and the third lever elements (13A, 13B) are, in an area of the lever elements (8A_1, 8A_2, 13A), of a fork-shaped design and respectively interspaced, by bearing points crossed by a bearing bolt (15) such that bearing torques resulting from bearing forces acting on the bearing bolt (15) are at least approximately zero and such that each of the first lever elements (8A_1, 8B_1), the second lever elements (8A_2, 8B_2) and the third lever elements (13A, 13B) are coupled by the bearing bolt (15) and pivot with respect to each other.

2. The vehicle according to claim 1, wherein one of the first, the second and the third lever elements (8A_1; 8A_2; 13A), at an area crossed by the bearing bolt (15), is situated within the fork-shaped design of the other two of the first, the second and the third lever elements (8A_1, 8A_2; 8A_1, 13A; 8A_2, 13A).

3. The vehicle according to claim 1, wherein the bearing bolt (15) is press fit into one of the first, the second and the third lever elements (8A_1, 8A_2; 8A_1, 13A; 8A_2, 13A).

4. The vehicle according to claim 1, wherein between the bearing bolt (15) and two of the first, the second and the third lever elements (8A_1, 8A_2; 8A_1, 13A; 8A_2, 13A) is at least one of a bearing device (17A, 17B, 18A, 18B; 19A, 19B, 20A, 20B; 21, 23; 25, 26), a sliding bearing and a roller bearing.

5. The vehicle according to claim 1, wherein a bearing sleeve (22) is connected, between one of the first, the second and the third lever elements (8A_1, 8A_2; 8A_1, 13A; 8A_2, 13A) and the bearing bolt (15), in a rotationally fixed manner with the one of the first, the second and the third lever elements (8A_1, 8A_2; 8A_1, 13A; 8A_2, 13A), another of the one of the first, the second and the third lever elements (8A_1, 8A_2; 8A_1, 13A; 8A_2, 13A) is rotatably located upon the bearing sleeve (22) of the one of the first, the second and the third lever elements (8A_1, 8A_2; 8A_1, 13A, 8A_2, 13A) connected therewith.

6. An axle pivot steering device (4) of a vehicle comprising:
a pair of first lever elements (8A_1, 8B_1);
a pair of second lever elements (8A_2, 8B_2), one of the pair of first lever elements (8A_1, 8B_1) is coupled to one of the pair of second lever elements (8A_2, 8B_2) at a first connection point and another of the pair of first lever elements (8A_1, 8B_1) is coupled to another of the pair of second lever elements (8A_2, 8B_2) at a second connection point;
a first wheel carrier (10A) is operatively coupled to the one of the pair of second lever elements (8A_2, 8B_2) and a second wheel carrier (10B) is operatively coupled to the other of the pair of second lever elements (8A_2, 8B_2);
one of a third pair of lever elements (13A, 13B) is coupled, in an articulated manner, to both the one of the pair of first lever elements (8A_1, 8B_1) and the one of the pair of second lever elements (8A_2, 8B_2) at the first connection point, and an opposite end of the one of the third pair of lever elements (13A, 13B) is pivotally coupled to a axle at a first fixed point of rotation (14A, 14B), each one of the pair of first of the lever elements (8A_2, 8B_2) is pivotably coupled to one of the pair of second lever elements (8A_2, 8B_2) and one of the third pair of lever elements (13A, 13B) such that the first, the second and the third lever elements pivot with respect to each other;

an other of the third pair of lever elements (13A, 13B) is coupled, in an articulated manner, to both the other of the pair of first lever elements (8A_1, 8B_1) and the other of the pair of second lever elements (8A_2, 8B_2) at the second connection point, and an opposite end of the other of the third pair of lever elements (13A, 13B) is pivotally coupled to the axle at a second fixed point of rotation (14A, 14B);

at least two of the one of the pair of first lever elements (8A_1, 8B_1), the one of the pair of second lever elements (8A_2, 8B_2) and the one of the third pair of lever elements (13A, 13B) are bifurcated and interlaced at the first connection point and coupled thereat by a first bearing bolt (15) such that torque forces subjected to the first bearing bolt (15) are at least substantially neutralized; and at least two of the other of the pair of first lever elements (8A_1, 8B_1), the other of the pair of second lever elements (8A_2, 8B_2) and the other of the third pair of lever elements (13A, 13B) are bifurcated and interlaced at the second connection point and are coupled thereat by a second bearing bolt (15) such that torque forces subjected to the second bearing bolt (15) are at least substantially neutralized.

* * * * *